United States Patent
von Bergmann et al.

(10) Patent No.: US 6,999,492 B2
(45) Date of Patent: Feb. 14, 2006

(54) REDUCED-MAINTENANCE EXCIMER LASER WITH OIL-FREE SOLID STATE PULSER

(75) Inventors: Hubertus von Bergmann, Somerset West (ZA); Spencer Merz, Brookline, MA (US); Gongxue Hua, Coral Springs, FL (US); Sergei V. Govorkov, Boca Raton, FL (US)

(73) Assignee: Lambda Physik AG, Goettingen (DE)

( * ) Notice: Subject to any disclaimer, the term of this patent is extended or adjusted under 35 U.S.C. 154(b) by 293 days.

(21) Appl. No.: 10/713,583

(22) Filed: Nov. 14, 2003

(65) Prior Publication Data

US 2005/0169341 A1    Aug. 4, 2005

Related U.S. Application Data

(60) Provisional application No. 60/427,798, filed on Nov. 20, 2002, provisional application No. 60/451,890, filed on Mar. 4, 2003, provisional application No. 60/463,654, filed on Apr. 17, 2003.

(51) Int. Cl.
*H01S 3/097* (2006.01)

(52) U.S. Cl. .............................. 372/81; 372/29; 372/38
(58) Field of Classification Search ................. 372/81, 372/29.013

See application file for complete search history.

(56) References Cited

U.S. PATENT DOCUMENTS

| | | | |
|---|---|---|---|
| 4,891,818 A | 1/1990 | Levatter | 372/57 |
| 5,142,166 A | 8/1992 | Birx | 307/419 |
| 5,177,754 A | 1/1993 | Ball et al. | 372/38 |
| 5,313,481 A | 5/1994 | Cook et al. | 372/37 |
| 5,369,655 A * | 11/1994 | Miyamoto et al. | 372/29.02 |
| 5,771,258 A | 6/1998 | Morton et al. | 372/57 |
| 6,005,880 A | 12/1999 | Basting et al. | 372/38 |
| 6,191,538 B1 * | 2/2001 | Hirschmann et al. | 315/240 |
| 6,198,761 B1 | 3/2001 | von Bergmann et al. | 372/86 |
| 6,466,599 B1 | 10/2002 | Bragin et al. | 372/58 |

FOREIGN PATENT DOCUMENTS

DE          3842492 A1    12/1988

* cited by examiner

*Primary Examiner*—Minsun O Harvey
*Assistant Examiner*—Dung Nguyen
(74) *Attorney, Agent, or Firm*—Stallman & Pollock LLP (57) ABSTRACT

An oil-free pulser design can be used to produce an excimer or molecular fluorine laser system that is lighter, cheaper to produce, and simpler than existing systems. Such designs allow a relatively low DC voltage to be applied to a main transformer, allowing the pulser to be run without oil cooling. This relatively low voltage can be increased to the necessary voltage level, such as on the order to 12 kV to 15 kV, needed to drive the laser system. This transference can be accomplished using standard components, such as a pair of capacitor elements that are pulse-charged in parallel, but can be discharged in series following a reversal of charge on one of the capacitor elements.

17 Claims, 10 Drawing Sheets

REDUCED-MAINTENANCE EXCIMER LASER WITH OIL-FREE SOLID STATE PULSER

CLAIM OF PRIORITY

This patent application claims priority to U.S. provisional patent applications:

"REDUCED-MAINTENANCE EXCIMER WITH OIL-FREE SOLID STATE PULSER," No. 60/427,798, filed Nov. 20, 2002;

"REDUCED-MAINTENANCE EXCIMER WITH OIL-FREE SOLID STATE PULSER," No. 60/451,890, filed Mar. 4, 2003; and "REDUCED-MAINTENANCE EXCIMER WITH OIL-FREE SOLID STATE PULSER," No. 60/463,654, filed Apr. 17, 2003, all of which are incorporated herein by reference.

CROSS-REFERENCE TO RELATED APPLICATIONS

The following applications are cross-referenced and hereby incorporated herein by reference:

U.S. Pat. No. 6,005,880, entitled "PRECISION VARIABLE DELAY USING SATURABLE INDUCTORS," to Dirk Basting et al., filed Mar. 21, 1997, and incorporated herein by reference in its entirety;

U.S. Pat. No. 6,198,761 B1, entitled "COAXIAL LASER PULSER WITH SOLID DIELECTRICS," to Dirk Basting et al., filed Mar. 21, 1997, and incorporated herein by reference in its entirety; and U.S. Pat. No. 6,466,599 B1 entitled DISCHARGE UNIT FOR A HIGH REPITITION RATE EXCIMER OR MOLECULAR FLUORINE LASER, filed Dec. 3, 1999, issued Oct. 15, 2002 and incorporated herein by reference in its entirety.

TECHNICAL FIELD OF THE INVENTION

The present invention relates to excimer lasers utilizing an oil-free solid state pulser, as well as excimer lasers having extended lifetimes of the laser gas and laser optics.

BACKGROUND

Many applications in fields such as photolithography and medicine require a laser operating at specific wavelengths, such as wavelengths of 308 nm using XeCl, 248 nm using KrF, 193 nm using ArF, and 157 nm using $F_2$. These applications typically require low energy, such as on the order of a few tens of millijoules, and a relatively high repetition rate of operation, such as on the order of hundreds to several thousands of pulses per second. These applications also require operation with very high reliability and low operating cost. There are several difficulties involved in obtaining a stable discharge in these lasers, due in part to the operating voltage required as a result of the low energy and small beam size, which are not present in lasers of higher energy. This stable discharge is necessary for the laser gas to have a sufficiently long lifetime. These performance requirements impose difficult constraints on the design of a laser pulser.

Such a laser is typically direct discharge pumped, normally at voltages in the range of 30 kV and at pulse repetition rates above 1 kHz. Peak electrical power input to the laser can be several tens of megawatts. Furthermore, to make the lithographic process commercially viable the equipment must not exhibit unscheduled down time and must deliver pulses of the highest stability, uniformity, and spectral quality for uninterrupted periods of weeks at a time. These requirements have in recent times led to the development of pulsers driven by solid state switches as an improvement on switch life. Replacement of the gaseous thyratron with a solid state switch has been proven to greatly extend laser service intervals and hence reduce operating costs, but whereas the thyratron operating range covers voltages of 20–30 kV, best utilization of solid state switch capabilities occurs at lower voltages, typically in the range of 1–5 kV.

A solid state switch can be used to drive a step-up pulse transformer and a multi-stage pulse compressor to reach correct laser operating voltage and voltage risetime. The attainment of the necessary voltage level, in the range of 30 kV, with sufficiently low circuit inductance, in the range of tens of nH or less, at multi-kilowatt average power levels is typically done with transformer oil, vapor phase coolants, or pressurized gas such as sulfur hexafluoride or nitrogen. Atmospheric air does not possess sufficient dielectric strength to withstand the necessary voltage stress or the necessary thermal properties to dissipate the generated heat. Leak-free containment of oil over long time periods is known to be difficult. Vapor phase coolants are expensive and primarily suited for heat removal rather than voltage insulation. Gas containment at the necessary several atmospheres pressure requires use of thick-walled pressure vessels and elaborate seals. In addition, for the above approaches a heat exchanger and pump are required to extract heat from the cooling medium. Using solid dielectrics such as thermal compounds in paste form in present pulser designs is cost prohibitive and would generate excessive temperature gradients due to their basic thermal properties. The low voltage portion of such a pulser operates at high effective currents that require cooling, and the high voltage portion requires positive air displacement to prevent corona generation and resulting breakdown. These requirements exist due in part to the high voltages, currents, and rates of change of these voltages and currents and the dimensional constraints imposed by the geometry of the laser system.

DETAILED DESCRIPTION

Systems and methods in accordance with embodiments of the present invention can overcome deficiencies in existing excimer laser systems by providing an oil-free pulser design for producing a system that is lighter, cheaper to produce, and simpler than existing excimer systems. Such embodiments allow a relatively low voltage to be applied to a main transformer, such as on the order of 1500 to 2000 V in one embodiment, and on the order of about 7000 V in another embodiment. This lower transformer voltage allows the pulser to be run without oil cooling as will be described in further detail below. This relatively low voltage can be increased to the necessary voltage level, such as on the order of 12 kV to 15 kV in one embodiment, needed to drive an excimer laser. Such an approach also can do away with the need for epoxy encapsulation or other relatively extreme approaches to achieving high voltage holdoff. This transference can be accomplished using standard components, such as standard dielectric materials, standard commercially available capacitors, magnetic components fabricated by conventional processes, and a single semiconductor switch. By using an approach of doubling the voltage after the pulse transformer, the pulse transformer and elements coming before the transformer are not subject to higher voltages, which can lead to fatigue mechanisms. Subjecting the pulse transformer and other elements to higher voltages can limit service life of the laser, particularly where an oil free design is being utilized.

An earlier design for an oil free pulser is described in U.S. Pat. No. 6,198,761 B1 entitled "COAXIAL LASER PULSER WITH SOLID DIELECTRICS," incorporated herein by reference above. Included in the description are some of the constraints and difficulties associated with transforming a DC voltage, appropriate for use with a solid state switch, to a pulse level in excess of 10 kV. Also described are difficulties in compressing this pulse to a length on the order of 50 ns, and matching a train of these pulses to a gaseous load with an impedance on the order of one ohm, which can change characteristics during a given pulse. The '761 patent also discusses different materials which can be used in an oil free design of lasers pulser systems.

Figure 1:
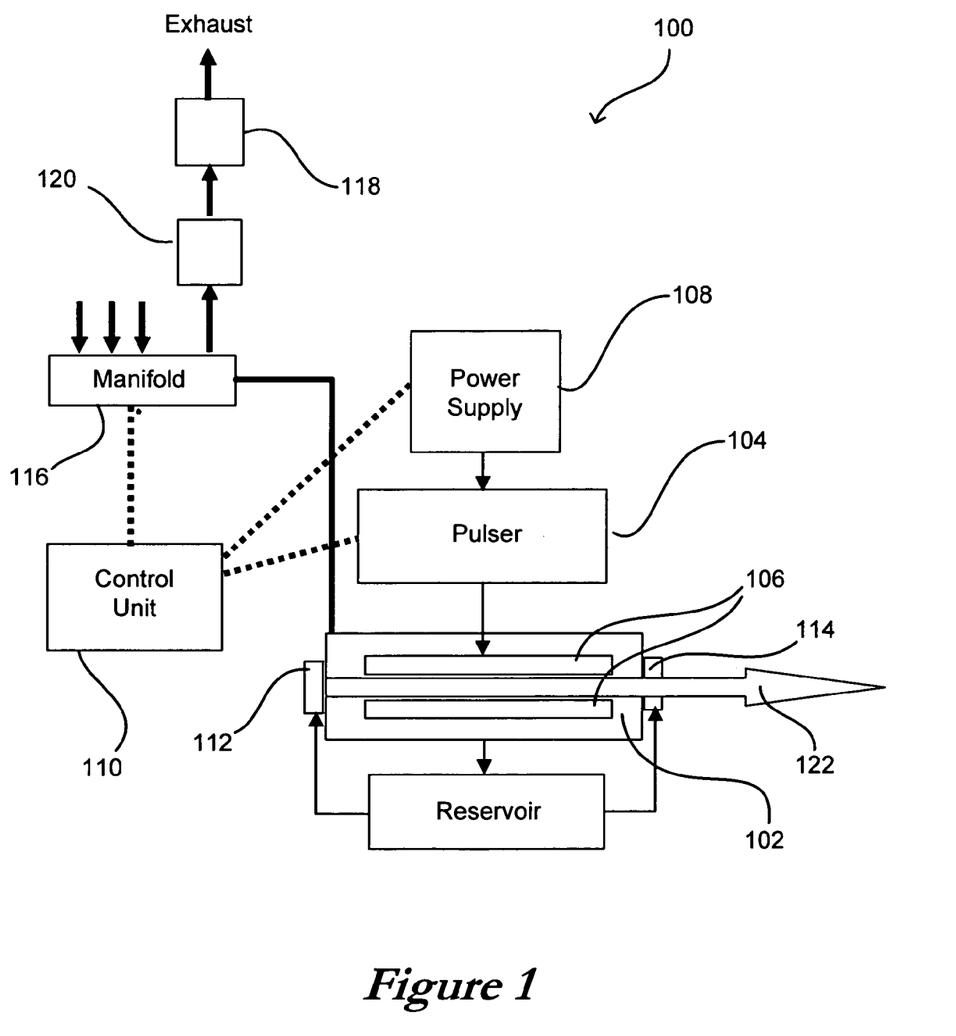
FIG. 1 is a diagram of a laser system that can be used in accordance with one embodiment of the present invention.

FIG. 1 shows the general layout of a laser system 100 that can be used in accordance with embodiments of the present invention. The laser system includes a discharge chamber 102 coupled to a pulser module 104. A pair of electrodes 106 inside the laser discharge chamber 102 can be used to excite a laser gas mixture in the discharge chamber. The pulser 104 can be energized by a high voltage power supply 108, which can be part of, or in communication with, a system control unit 110. Resonator optics, such as may include a high reflectivity (HR) mirror 112 and output coupler 114, can be attached directly to the discharge chamber 102, such that the laser gas mixture is sealed inside the chamber. A gas manifold 116, together with a vacuum pump 118 and halogen filter 120, are exemplary elements that can be contained in a gas replacement system, which can fill the discharge chamber 102 with a gas mixture and can periodically replace the gas. The pulser module 104 can generate short electrical pulses, such as pulses having a risetime on the order of 50 to 100 ns at up to 15 kV, and current on the order of 1000 A, in order to electrically excite gas inside the chamber. The generation of these pulses can create optical gain, which in the presence of optical feedback provided by the resonator mirrors 112, 114 can produce an output beam 122.

While a basic oil free pulser design is described in U.S. Pat. No. 6,198,761, systems and methods in accordance with embodiments of the present invention utilize a pulse compressor that is simpler to assemble, is lighter and cheaper, and can provide an additional safety margin against voltage flashovers. Rather than develop the necessary high voltage across a single turn secondary as in U.S. Pat. No. 6,198,761, a more traditional transformer design can be employed to drive an L-C inversion circuit, such as that described in U.S. Pat. No. 6,005,880, incorporated herein by reference above. The design here offers advantagous over the oil free pulse design discussed in the '761 patent in that it allows application of a much lower voltage on the transformer, which reduces the potential flashovers due to corona effects.

Insulation and corona problems at 10 kV and higher can result in eventual insulator degradation and breakdown. It can therefore be desirable to run at lower voltage levels, where this effect can be far less problematic. A corona-free pulse transformer can be utilized that operates at about one half of the required voltage, such as on the order of about 7 kV. Two high-voltage capacitors can be placed on the high voltage side of the transformer, as is described for example with respect to FIGS. 6 and 7, and as is shown in electrical circuits of FIGS. 2–5, such that the lower high voltage capacitor (capacitor C2 204 in FIG. 2 for example) can be inverted in order to achieve approximate doubling on series connected capacitors. A magnetic switch can be used at this stage of compression, and such a magnetic switch can be implemented in any of a number of different ways. A first approach is described with reference to the circuit 200 of FIG. 2. In this circuit, a pulse transformer T1 202 can be made to act as a saturable element, which can be exposed to roughly one-half of the voltage necessary for the discharge. The saturable core of the pulse transformer is selected such that as the pulse transformer reaches its voltage peak, the core collapses. At this point the charge stored on the capacitor 204 is discharged through the winding of the transformer T1 202 and subsequently the charge is stored with reversed polarity on the capacitor C2 204.

Figure 2:
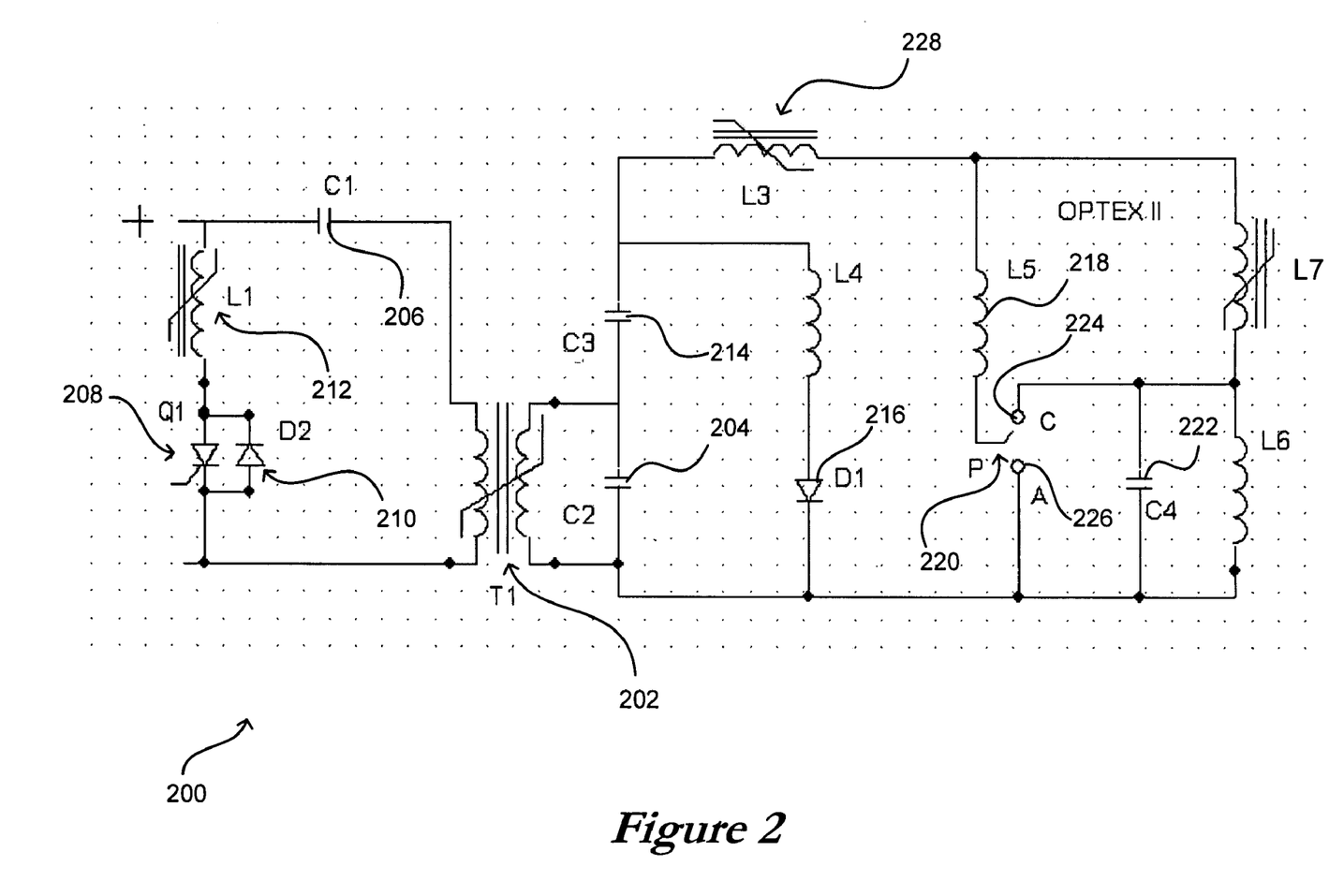
FIG. 2 is a diagram of a circuit that can be used with the system of FIG. 1.

By providing for capicitors C2 204 and C3 214 in series, and providing a circuit which reverses the polarity of the voltage stored on C2, the voltage applied to the pulser circuit by the combination of C2 204 and C3 214 is approximately double the volatage which is output by the transformer 202. This lower voltage requirement for the pulse transformer allows for utililization of a conventional oil-free pulse transformer design which is not suseptible to corona discharge problems. This conventional design can utilize standard components, such as a standard transformer available from ATW Electronics of Charlestown, Mass.

As shown in FIG. 2 the voltage doubler circuit includes the capacitors C2 and C3, and utilizes a magnetic switch, which in the case of FIG. 2 is a winding of the pulse transformer and the saturable core. When the voltage peak of the transformer 202 is reached, the core of the transformer collapses and subsequently the polarity of the charge stored on C2 is reversed. In some applications the collapse on the core and charge reversal can make the design of the transformer quite difficult, however, as the core can be driven into saturation with each pulse. This can result in generation of heat, which depending on the specific system configuration can be difficult to effectively dissapate in an oil free design.

A primary portion of the pulser circuit 200 is composed of primary energy store capacitor C1 206, magnetic switch or thyristor Q1 208 with reverse clipper diode D2 210, magnetic assist saturable inductor L1 212, and step-up transformer T1 202. The exemplary primary storage capacitor C1 206 can be charged to a maximum of 1.8 kV from a precision regulated, current limited charging source, such as is available from HPE GmbH of Grassau, Germany; KSI of Beverly, Mass., USA; or Lambda EMI of Neptune, N.J., USA. Thyristor Q1 208 can be obtained from such sources as Dynex of Lincoln, U.K., or Westcode of Long Beach, Calif., USA. The asymmetric construction can accommodate a relatively high rate of rise of current. Diode D2 210 can be included for protection, since this type of semiconductor can have a very low reverse voltage capability. Capacitor C1 206 can be made of an array of polypropylene film capacitors of 2 KVDC rating, available from such suppliers as Nissei Arco or WIMA with sales and distribution offices worldwide. An array of some 17 pieces, each of 0.047 $\mu$F, can be employed in this embodiment to remain within the RMS current rating of the basic part, as well as to provide sufficient cooling at the high repetition rate employed. Capacitors C2 204 and C3 214 can employ a ceramic N4700 dielectric material for low temperature and voltage coefficients, and can be obtained from sources such as MuRata and TDK, both of Japan with U.S. representation and sales.

Charging diode D1 216 can be obtained from IXYS of Santa Clara, Calif., USA, and can be made up of a series string of 20 devices rated at 1 kV inverse voltage and 30 ADC forward current. The string can employ a resistor in parallel with each diode to force voltage sharing during the time that inverse voltage is impressed across the string. Reverse leakage current of the diodes can vary by an order of magnitude with random sampling, such that forced sharing can be necessary to avoid diode selection in the assembly. The parts selected can be of an ultra-fast, soft recovery type. Inductor L5 218, shown as a single element, can be composed in one embodiment of 48 coils that drive an equal number of preionizer pins "P" 220, and which serve to define and stabilize the arcs thus formed to accomplish effective preionization. Peaking capacitor C4 222 can be similarly composed of some 20 pieces of a ceramic capacitor, such as is available from MuRata or TDK of Japan, which are distributed along the sides of the laser chamber to provide maximum change in current with respect to time, and an efficient discharge at the cathode electrodes "C" 224 and anode electrodes "A" 226. Core material used for compressors L1 212 and L3 228 can be made of a nanocrystalline material such as that manufactured by Hitachi Heavy Metals of Japan, with U.S. offices in Chicago, Ill.

Figure 3:
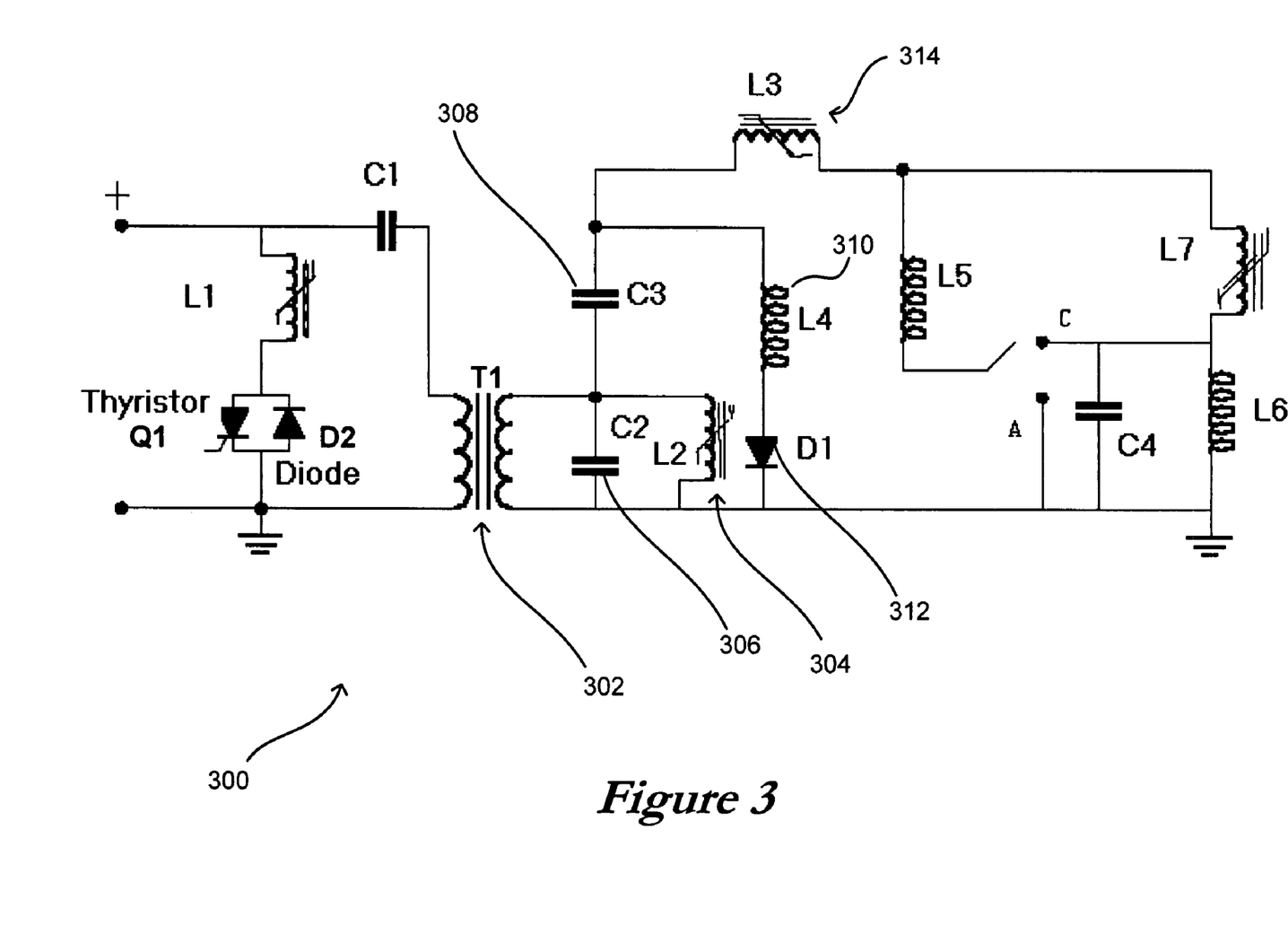
FIG. 3 is a diagram of another circuit that can be used with the system of FIG. 1.
Figure 4:
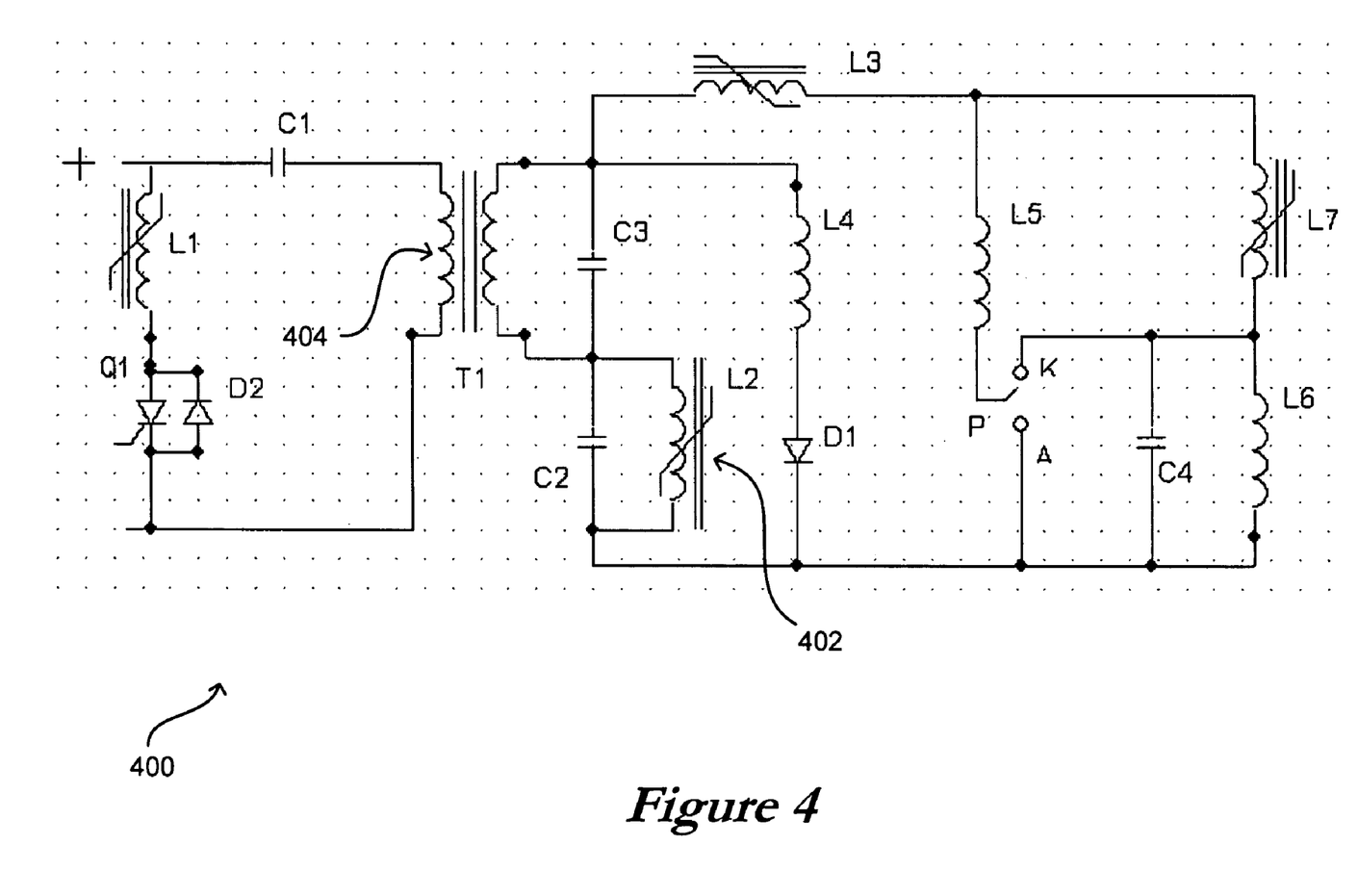
FIG. 4 is a diagram of another circuit that can be used with the system of FIG. 1.

FIGS. 2, 3, and 4 differ in the implementation of the first compression stage and the L-C inversion function. A second implementation, described with respect to the circuit 300 of FIG. 3, can provide much better cooling for the pulse transformer T1 302 than the circuit of FIG. 2. In this approach, a magnetic compressor L2 304 can be placed across the upper capacitor plate C2 306. This approach can provide for easier heat removal due to the greatly increased radiating surface available from both the windings and the core of L2.

Capacitor plates C2 306 and C3 308 in this embodiment are pulse-charged in parallel, and are discharged in series following the reversal of charge on capacitor plate C2 306. The charge path for the secondary current of the pulse transformer T1 can go through inductor L4 310 and diode D1 312, which can divert current from second compressor stage L3 314 during this cycle. Inductor L4 310 can limit the peak current, and diode D1 312 can block the negative voltage seen at the upper end of lower capacitor plate C3 308 after compressor L2 304 switches. The upper and lower capacitor plates will be described in more detail with respect to FIG. 6, below.

Capacitors C2 and C3, along with inductor L2, which operates as a magnetic switch, make up a voltage doubling circuit that can take a charge from the transformer T1, double the voltage, and pass the doubled voltage on to the cathode C and anode A of the discharge chamber. This allows the pulse transformer T1 302 to be run at a lower voltage, which can be important as the transformer is a critical component that can be damaged by the higher voltage and any resulting corona discharges. The higher voltage can be limited to those components which are diposed between the series discharge of capacitors C2 and C3 and the discharge between the cathode C and anode A electrodes, where these components can be designed to accomodate this higher voltage. Further, because the transformer T1 is not exposed to the higher voltage, less stress is placed on the transformer windings and core, thus there is no need for oil cooling in order to preserve the transformer and associated components. Simple fans can be used to cool the voltage doubling components, making the system cheaper and more simple to operate.

Another exemplary approach is shown in the circuit 400 of FIG. 4. In this circuit, additional impedance is placed between inductor L2 402 and the secondary winding of the pulse transformer T1 404, as the transformer is connected across capacitor C3 instead of capacitor C2 as in FIGS. 2 and 3. An advantage to such a configuration is that when L2 switches, the pulse transformer T1 does not act as a shunt for resonant charge transfer or reversal of the charge on C2 that passes through L2. A disadvantage to such a configuration, however, is that the voltage stress is doubled between the primary and secondary windings of the pulse transformer T1 404.

Figure 5:
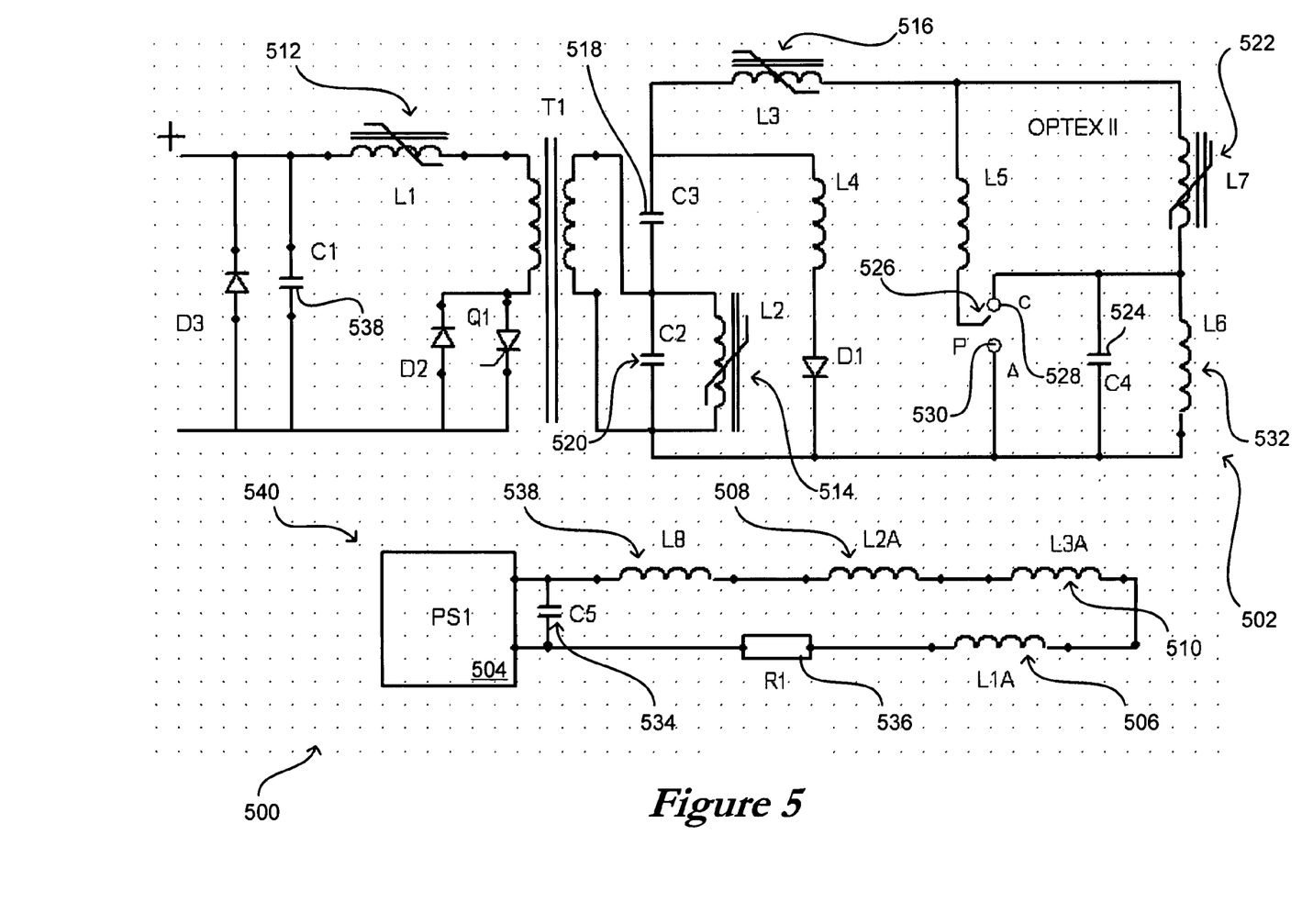
FIG. 5 is a diagram of another circuit that can be used with the system of FIG. 1.

Another exemplary approach is shown in the circuit 500 of FIG. 5. In this circuit, isolation is placed between the pulser circuit 502 and a power supply (not shown) which would apply a charge to the storage capacitor C1 538 power supply, which can improve pulse-to-pulse charging reproducibility. Reset control circuit 540 operates to provide reset currents to compressor inductors of the pulser 502. Inductors L1A 506, L2A 508, and L3A 510 can serve as reset windings of inductors L1 512, L2 514, and L3 516, respectively. Compressor stage L3 516 can further reduce the pulse width of the output of upper compressor stage L2 514. In order for L3 516 to function properly, there should be a path for the necessary magnetizing current. This path can be provided through inductor L7 522 and peaking capacitor C4 524. One difficulty with laser tubes of such a small size is that the close electrode spacing "d" can result in the premature firing of preionizer pins "P" 526 to main cathode "C" 528. When firing prematurely, the main gap fires before full charge is transferred from capacitor plates C2 520 and C3 518 to peaking capacitor C4 524. To prevent such an occurrence, inductor L7 522 can be used to delay the potential between electrodes P 526 and C 528 of the laser tube, such that the P-C gap strikes only shortly before the A-C main gap, with "A" 530 corresponding to the anode of the discharge chamber. This condition can be further enhanced, to some extent, by an increase in tube gas pressure. Increased pressure can yield a higher "$P_d$" breakdown product, where $P_d$ is the pressure at electrode spacing "d." A value of inductor L7 522 that is too small can cause peaking capacitor C4 524 to assume a positive charge during the early compression cycle, thereby offsetting the negative voltage required for proper discharge. A value of L7 522 that is too large can lead to the premature P-C breakdown discussed above. Both requirements can be met if L7 522 has a relatively large value of inductance during the early part of the compression cycle, and a relatively small value of inductance during the later part of the cycle. This can be accomplished by making L7 522 a delay element as illustrated in FIG. 3. Inductor L6 532 does not take part in the compressor action described above, but can simply be used to ensure that any residual charge on peaking capacitor array C4 524 will be bled away prior to a subsequent pulse.

Power supply PS1 504 can be a 3.3 V, 6 A constant voltage power supply built for the semiconductor market, such as that available from Digi-Key of Thief River Falls, Minn., USA; as well as Newark Electronics of Chicago, Ill., USA. Inductor L8 538 and capacitor C5 534 can serve as a low-pass filter network to isolate the power supply 504 from the transient voltage spikes generated by the transformer action of each of the cores requiring reset current. Wire wound resistor R1 536 can limit current to an optimum level. The dissipation of R1 536 can be trivial compared to power consumed by the laser, such that a more sophisticated means of current regulation is not required.

Figure 6:
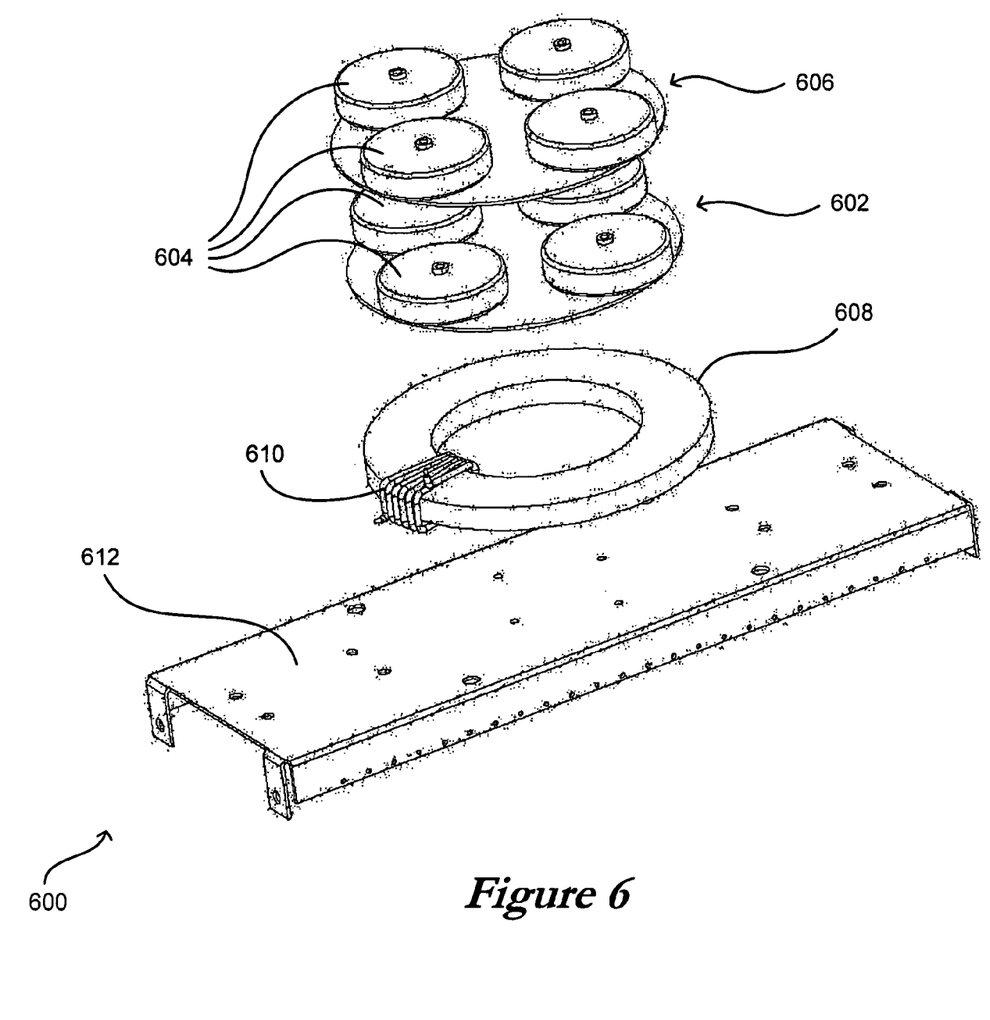
FIG. 6 is an exploded perspective view of a voltage doubling component configuration that can be used with the circuits of FIGS. 2–5.
Figure 7:
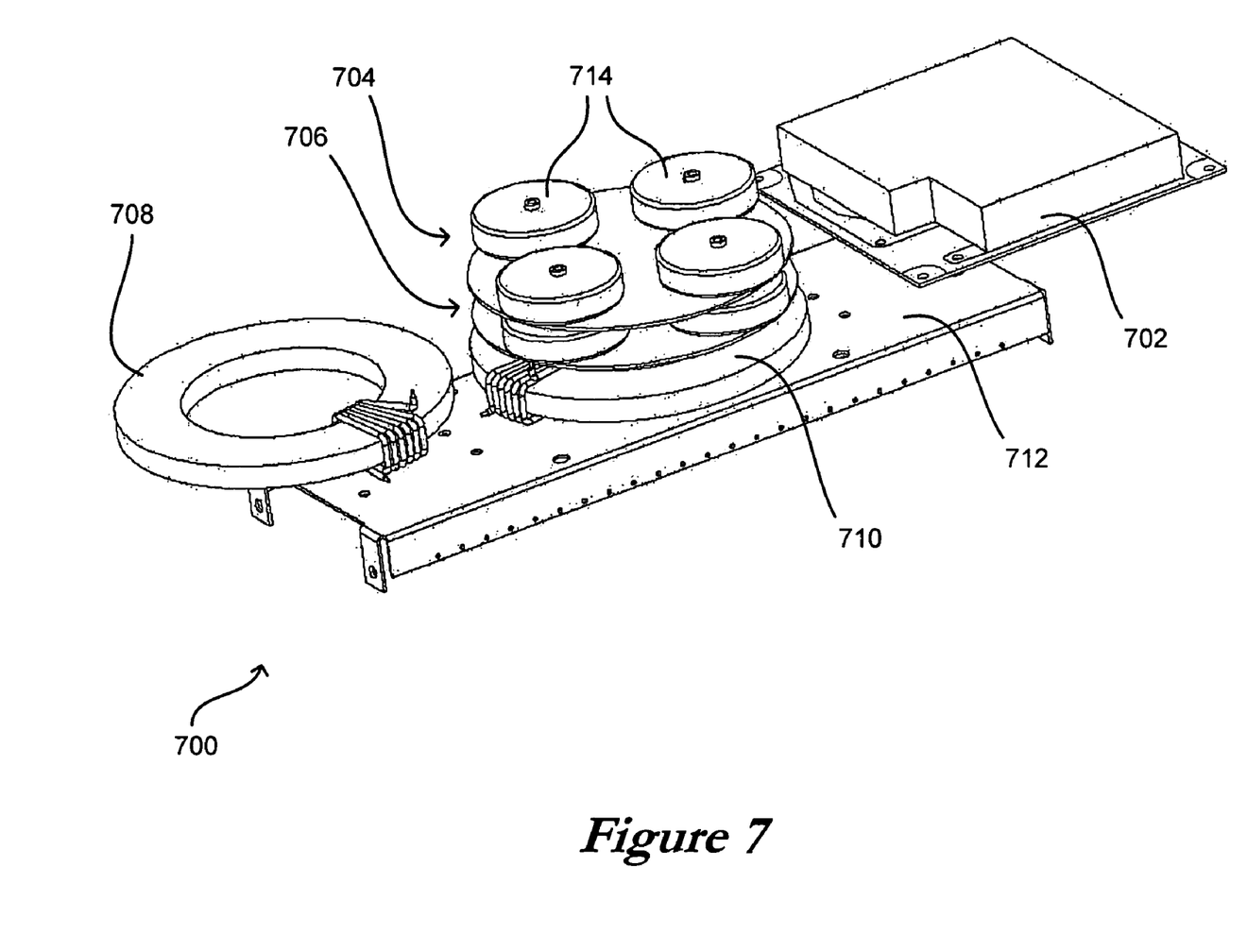
FIG. 7 is a perspective view of a voltage doubling component configuration that can be used with the circuits of FIGS. 2–5.

Aspects of actual implementations and physical configurations of components for exemplary pulser designs shown in FIGS. 2–5 are shown in FIGS. 6–7. In order to better understand the geometric arrangement of FIG. 6, the arrangement will be described in conjunction with the circuit diagram of FIG. 2. It should be understood, however, that this combination is merely exemplary and that many other such combinations are possible as would be understood to one of ordinary skill in the art in light of the teachings herein. FIG. 6 shows some elements for a voltage doubling portion of a pulser circuit, in this example comprising a number of ceramic disc capacitors 604 arranged on an upper capacitor plate as capacitor array C2 606, and on a lower capacitor plate as lower capacitor array C3 602. As can be seen in the circuit of FIG. 2, capacitor array C2 can be electrically connected to the output of pulse transformer T1. Lower capacitor array C3 602 also can be connected to transformer T1 as shown in FIG. 2, such that C2 and C3 can be charged in parallel. Capacitor array C2 606 can be mounted atop C3 602, and the upper terminals of C2 606 can be returned to ground by copper side plates (not shown), which can enclose both sides of the assembly. In this manner, a series discharge from capacitor arrays C2 and C3 can lead to a rise time at peaking capacitor C4 of approximately 50 ns, ensuring an efficient discharge into the laser gas.

The lower capacitor array C3 602 can be positioned immediately adjacent to compressor core L3 608, which and can act as a compressor stage for a charge pulse transferred from the series of C2 and C3. Inductor L3 core 608 is shown to be wound with 16 windings 610 in parallel. These windings 610 can connect lower capacitor array C3 602 to the support plate 612. Inductor L5 (not shown in FIG. 6), as well as the discharge chamber and other elements, can be positioned below, and in electrical contact with, the support plate in FIG. 6. Inductor L5 also can be positioned between compressor L3 and the discharge chamber as seen in FIG. 2. In one embodiment, 48 inductors can be connected in parallel below the support plate and coupled to the pre-ionization pins, shown at point P in FIG. 2. The pulser arrangement shown in FIG. 6 can be exposed to the high voltage, such as the 15 kV voltage, in accordance with various embodiments. To subsequently transfer voltage to the C4 array, as seen in FIG. 2, loop inductance can be held well below 200 nH. Specifically this refers to the inductance of the loop after the discharge from the capacitors C2 and C3, when utilizing the types of components described above and a configuration as illustrated FIG. 6.

Additional components can be utilized in such a pulser arrangement, as seen for example in the the arrangement 700 of FIG. 7. In FIG. 7, compressor L2 708 is shown mounted on support plate 712. Compressor L2 708 can be applied across capacitor array C2 704, comprising ceramic disc capacitors 714 arranged on an upper capacitor plate, as described above with respect to FIG. 3. Capacitor C1 702 also can be mounted adjacent the support plate 712. Capacitor C1 can receive charge from a high voltage power supply (not shown), in order to provide a charge pulse to transformer T1 (not shown) when triggered by switch Q1. Capacitor C1 will have a much higher capacitance than capacitor arrays C2 704 and C3 706, and will work at a much lower voltage. C1 can be a film capacitor, for example, instead of a ceramic array. In operation, approximately 1 J can be stored in C1 702. As seen in FIG. 3, the charge stored in capacitor C1 can be transferred to main pulse transformer T1, which can step up the voltage appropriately and transmit a charge to capacitor arrays C2 and C3. The transfer can occur in approximately 3.6 $\mu$s, with the peak voltage at C2 and C3 in series being approximately 14 kV. Compressor L2 can conduct for approximately 600 ns, and the pulse can be further compressed by compressor L3 to present a voltage across peaking capacitor C4, as seen in FIG. 3, with a rise time of approximately 60 ns.

The pulser arrangement of FIG. 7 can be utilized differently in various embodiments. For example, FIG. 4 shows a circuit wherein capacitor plate C3 is connected across the pulse transformer T1. Capacitor plate C2 is connected such that C2 and C3 can still be charged in parallel and discharged in series. The electrical removal of the transformer T1 from inverting components C2 and C3 can provide additional impedance between transformer T1 and inductor L2. The geometric arrangement of components, however, can remain as is shown in FIG. 7. The circuit of FIG. 5 shows another examle of how the geometric arrangement of FIG. 7 can be utilized with the pulser circuit.

Figure 8:
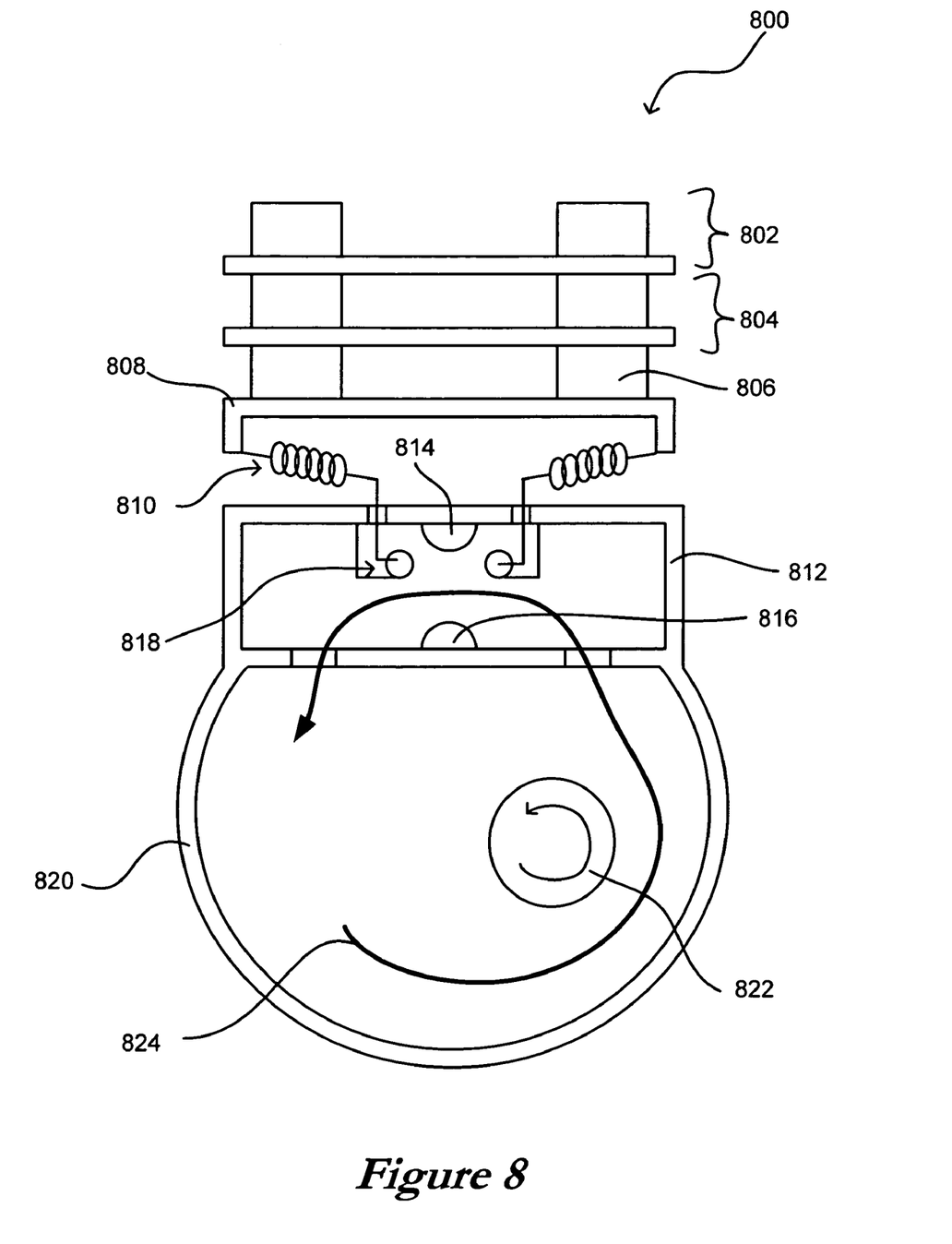
FIG. 8 is a diagram of another laser system that can be used with the voltage doubling configurations of FIGS. 6 and 7.

Pulser arrangements as shown in FIGS. 6 and 7 can be positioned atop a laser discharge chamber as shown in the arrangement 800 of FIG. 8. Shown in cross-section, a pulser arrangement as shown in FIG. 6, consisting of capacitor arrays C2 802 and C3 804, overlying compressor L3 806 on metal support plate 808, is positioned above a laser discharge chamber 812. The support plate is connected to the discharge chamber 812 by inductor L5 810. The discharge chamber can be any of any appropriate design, but is shown to include cathode 814 and anode 816 electrodes and a set of pre-ionization pins 828 as is known in the art. The discharge chamber has an opening on either side of the electrodes to allow a flow 824 of gas to pass between the electrodes from a gas reservoir 820. A fan 822 in the reservoir can be used to generate the flow between the electrodes.

Gas Circulation System

Systems and methods in accordance with embodiments of the present invention can also reduce the cost of running an excimer laser by increasing the lifetime of the laser gas and the laser optics. Reductions can be obtained through novel designs of the discharge chamber and gas circulation system. The lifetime of a gas in an excimer laser can be determined by parameters including the gas volume, the quality or uniformity of the discharge, and the chemical composition of materials used in the discharge chamber. The lifetime of the laser optics is reduced mostly by contamination due to dust particles generated in the discharge area. An increase in the lifetime of the laser optics can be obtained by increasing the volume of the discharge chamber without sacrificing other design parameters, such as the gas circulation speed, with minimal complexity in the design of the fan or blower system. The optics lifetime can also be increased by circulating gas through the windows area of the discharge chamber in order to minimize contamination by dust particles. Further, the gas can be purified by removing the dust particles from the discharge chamber.

Figures 9, 9A, 9B:
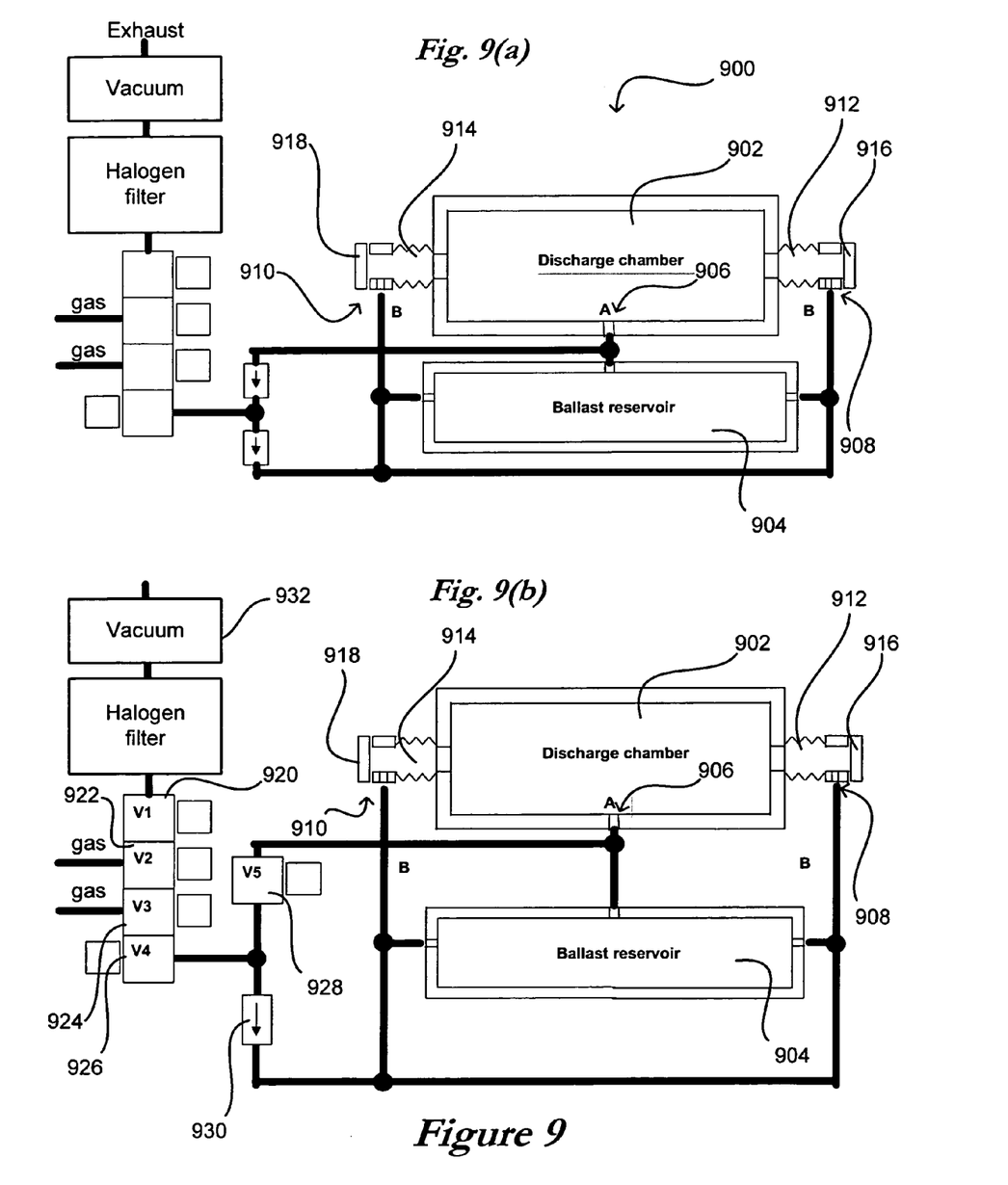
FIG. 9 is a diagram of another laser system that can be used in accordance with various embodiments of the present invention.

An example of an improved gas circulation system that can be used in accordance with embodiments of the present invention is shown schematically in FIG. 9. As seen in FIG. 9(a), the main discharge chamber 902 of an excimer laser system 900 can be connected to an additional ballast reservoir 904 using three routes, including a gas flow connection 906 at point (A) in the middle of the chamber, and gas flow connections 908, 910 at points (B) adjacent to the window areas 912, 914 of the discharge chamber. The ballast reservoir 904 can be used to increase the effective volume of gas in the chamber. The presence of a gas such as a halogen gas (i.e., fluorine or chlorine) is one mechanism that can be controlled to reduce the interval between gas replacements, as the halogens tend to react with chamber components. Increasing the available volume of gas by including the ballast reservoir 904 also serves to increase the amount of the halogen in the system, such that the time necessary to consume the available halogen is increased.

The additional ballast reservoir 904 can also serve as a trap for dust particles. The laser gas can flow from the discharge chamber 902 into the ballast 904 at the point "A" 906, as the gas pressure in the chamber can be higher than at points "B" 910, 912 due to the placement and configuration of a blower fan of the system (not shown). Locating point A in the center of the chamber 902 can allow the outlet to be on the high pressure or output side of the fan. Since the gas flow rate through the inlet "A" can be relatively small, such as on the order of one to several liters per minute, and the volume of the reservoir is relatively large, the gas velocity inside the reservoir 904 can be extremely small. The relatively slow gas velocity in the ballast can allow the dust particles to settle at the bottom of the reservoir, such that the gas exiting at points "B" 910, 912 is relatively purified. A purified gas flow through window areas near point "B" also can prevent dust particles from flowing towards, and contaminating, the windows.

Even though the relatively purified gas is output at points B 910, 912 near the windows 916, 918, some dust particles can still settle in bellows and/or baffles (not shown) close to the windows. The dust particles can come from the relatively purified gas, or can come from the bulk gas in the discharge chamber 902. To periodically remove these dust particles, an arrangement of check-valves 930 and solenoid valves 920, 922, 924, 926, 928 can be used, such as the exemplary arrangement shown in FIG. 9(b). These valves can be used to direct the flow of the fresh gas at each gas refill into the chamber 902 from the windows areas 912, 914, rather than through the inlet at point "A" 906. In this way, dust particles settling near the windows can be purged back into the main chamber volume at each new gas fill. When the chamber is evacuated during a re-fill cycle, the check valves 930 also can function to prevent "contaminated" gas in the chamber 902 from escaping through the outlets at points "B" 908, 910, as this would otherwise create a gas flow towards the windows 916, 918. One potential problem with the check valves resides in the fact that there can be a minimal pressure required to open the valves in a forward direction, which can prevent chambers from completely evacuating. FIG. 9(b) shows an a more complex arrangement that in FIG. 9(a), which can overcome this potential problem, wherein solenoid valve V5 928 opens during evacuation and closes during the fill portion of the cycle. Valve V5 928 can be controlled by a dedicated line from a computer or control unit, or can be connected in parallel to the vacuum pump 932 or valve V1 920, such that V5 always can be open during evacuation. In another variation, the check valve 930 can be replaced by a solenoid valve.

It should be noted that there are numerous arrangements that can obtained using approaches such as those described above, and the configurations described are meant to be illustrative examples rather than exhaustive descriptions.

Laser System

Figure 10:
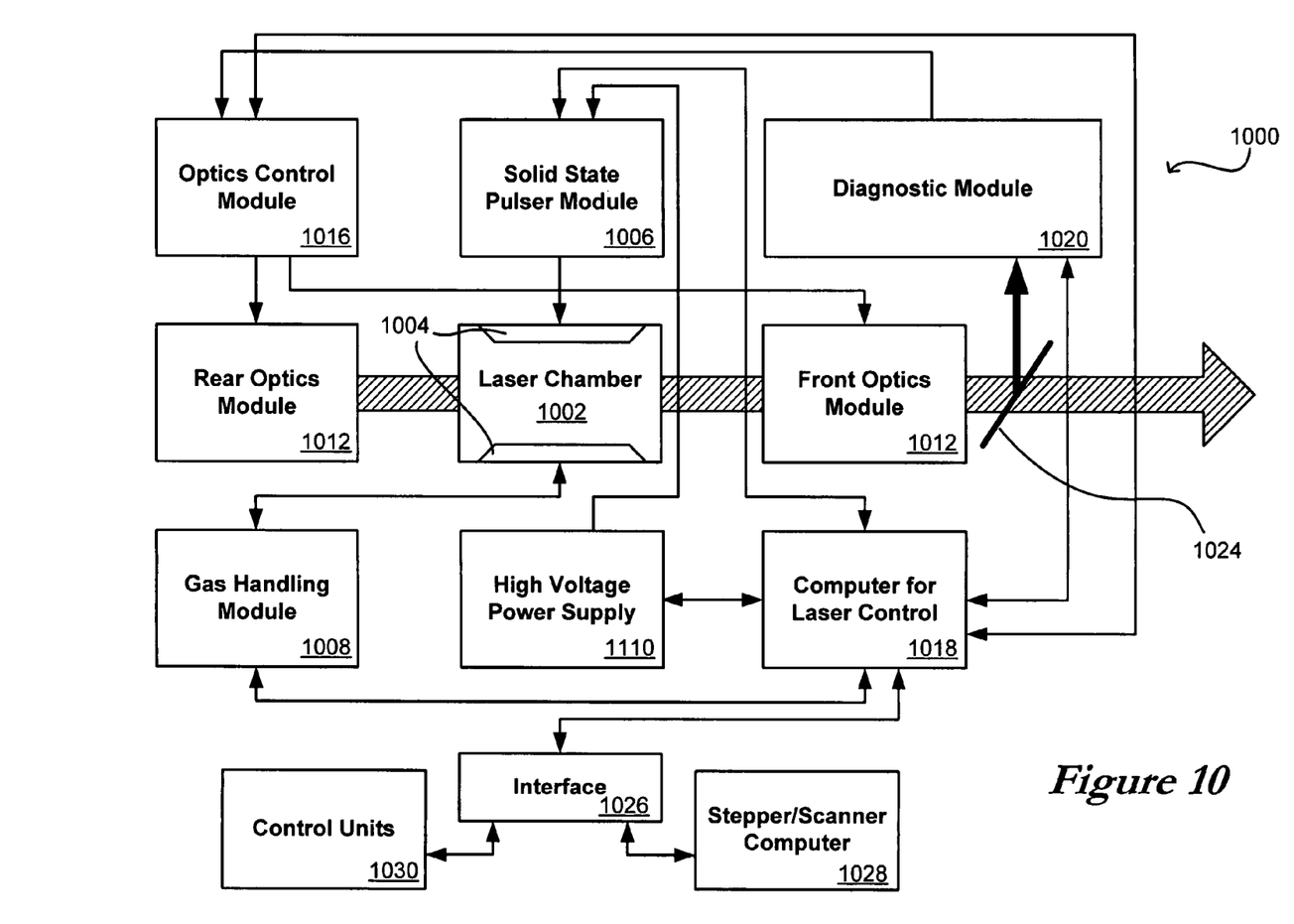
FIG. 10 is a diagram of another laser system that can be used in accordance with various embodiments of the present invention.

FIG. 10 shows components of an excimer or molecular fluorine laser system 1000 that can be used in accordance with various embodiments of the present invention. The gas discharge laser system can be a deep ultraviolet (DUV) or vacuum ultraviolet (VUV) laser system, such as an excimer laser system, e.g., ArF, XeCl or KrF, or a molecular fluorine ($F_2$) laser system for use with a DUV or VUV lithography system.

The laser system 1000 includes a laser chamber 1002 or laser tube, which can include a heat exchanger and fan for circulating a gas mixture within the chamber or tube. The chamber can include a plurality of electrodes 1004, such as a pair of main discharge electrodes and one or more preionization electrodes connected with a solid-state pulser module 1006. A gas handling module 1008 can have a valve connection to the laser chamber 1002, such that halogen, rare and buffer gases, and gas additives, can be injected or filled into the laser chamber, such as in premixed forms for ArF, XeCl and KrF excimer lasers, as well as halogen, buffer gases, and any gas additive for an $F_2$ laser. The gas handling module 1008 can be preferred when the laser system is used for microlithography applications, wherein very high energy stability is desired. A gas handling module can be optional for a laser system such as a high power XeCl laser. A solid-state pulser module 1006 can be used that is powered by a high voltage power supply 1010. Alternatively, a thyratron pulser module can be used. The laser chamber 1002 can be surrounded by optics modules 1012, 1014, forming a resonator. The optics modules 1012, 1014 can include a highly reflective resonator reflector in the rear optics module 1012, and a partially reflecting output coupling mirror in the front optics module 1014. This optics configuration can be preferred for a high power XeCl laser. The optics modules 1012, 1014 can be controlled by an optics control module 1016, or can be directly controlled by a computer or processor 1018, particularly when line-narrowing optics are included in one or both of the optics modules. Line-narrowing optics can be preferred for systems such as KrF, ArF or $F_2$ laser systems used for optical lithography.

The processor 1018 for laser control can receive various inputs and control various operating parameters of the system. A diagnostic module 1020 can receive and measure one or more parameters of a split off portion of the main beam 1022 via optics for deflecting a small portion of the beam toward the module 1020. These parameters can include pulse energy, average energy and/or power, and wavelength. The optics for deflecting a small portion of the beam can include a beam splitter module 1024. The beam 1022 can be laser output to an imaging system (not shown)

and ultimately to a workpiece (also not shown), such as for lithographic applications, and can be output directly to an application process. Laser control computer 1018 can communicate through an interface 1026 with a stepper/scanner computer, other control units 1028, 1030, and/or other, external systems.

The laser chamber 1002 can contain a laser gas mixture, and can include one or more preionization electrodes in addition to the pair of main discharge electrodes. The main electrodes can be similar to those described at U.S. Pat. No. 6,466,599 B1 (incorporated herein by reference above) for photolithographic applications, which can be configured for a XeCl laser when a narrow discharge width is not preferred.

The solid-state or thyratron pulser module 1006 and high voltage power supply 1010 can supply electrical energy in compressed electrical pulses to the preionization and main electrodes within the laser chamber 1002, in order to energize the gas mixture. The rear optics module 1012 can include line-narrowing optics for a line narrowed excimer or molecular fluorine laser as described above, which can be replaced by a high reflectivity mirror or the like in a laser system wherein either line-narrowing is not desired (XeCl laser for TFT annealling, e.g.), or if line narrowing is performed at the front optics module 1014, or a spectral filter external to the resonator is used, or if the line-narrowing optics are disposed in front of the HR mirror, for narrowing the bandwidth of the output beam.

The laser chamber 1002 can be sealed by windows transparent to the wavelengths of the emitted laser radiation 1022. The windows can be Brewster windows, or can be aligned at an angle, such as on the order of about 5°, to the optical path of the resonating beam. One of the windows can also serve to output couple the beam.

After a portion of the output beam 1022 passes the outcoupler of the front optics module 1014, that output portion can impinge upon a beam splitter module 1024 including optics for deflecting a portion of the beam to the diagnostic module 1020, or otherwise allowing a small portion of the outcoupled beam to reach the diagnostic module 1020, while a main beam portion is allowed to continue as the output beam 1020 of the laser system. The optics can include a beamsplitter or otherwise partially reflecting surface optic, as well as a mirror or beam splitter as a second reflecting optic. More than one beam splitter and/or HR mirror(s), and/or dichroic mirror(s) can be used to direct portions of the beam to components of the diagnostic module 1020. A holographic beam sampler, transmission grating, partially transmissive reflection diffraction grating, grism, prism or other refractive, dispersive and/or transmissive optic or optics can also be used to separate a small beam portion from the main beam 1022 for detection at the diagnostic module 1020, while allowing most of the main beam 1022 to reach an application process directly, via an imaging system or otherwise.

The output beam 1022 can be transmitted at the beam splitter module, while a reflected beam portion is directed at the diagnostic module 1020. Alternatively, the main beam 1022 can be reflected while a small portion is transmitted to a diagnostic module 1020. The portion of the outcoupled beam which continues past the beam splitter module can be the output beam 1022 of the laser, which can propagate toward an industrial or experimental application such as an imaging system and workpiece for photolithographic applications.

For a system such as a molecular fluorine laser system or ArF laser system, an enclosure (not shown) can be used to seal the beam path of the beam 1022 in order to keep the beam path free of photoabsorbing species. Smaller enclosures can seal the beam path between the chamber 1002 and the optics modules 1012 and 1014, as well as between the beam splitter 1024 and the diagnostic module 1020.

The diagnostic module 1020 can include at least one energy detector to measure the total energy of the beam portion that corresponds directly to the energy of the output beam 1022. An optical configuration such as an optical attenuator, plate, coating, or other optic can be formed on or near the detector or beam splitter module 1024, in order to control the intensity, spectral distribution, and/or other parameters of the radiation impinging upon the detector.

A wavelength and/or bandwidth detection component can be used with the diagnostic module 1020, the component including for example such as a monitor etalon or grating spectrometer. Other components of the diagnostic module can include a pulse shape detector or ASE detector, such as for gas control and/or output beam energy stabilization, or to monitor the amount of amplified spontaneous emission (ASE) within the beam, in order to ensure that the ASE remains below a predetermined level. There can also be a beam alignment monitor and/or beam profile monitor.

The processor or control computer 1018 can receive and processe values for the pulse shape, energy, ASE, energy stability, energy overshoot for burst mode operation, wavelength, and spectral purity and/or bandwidth, as well as other input or output parameters of the laser system and output beam. The processor 1018 also can control the line narrowing module to tune the wavelength and/or bandwidth or spectral purity, and can control the power supply 1010 and pulser module 1006 to control the moving average pulse power or energy, such that the energy dose at points on the workpiece can be stabilized around a desired value. In addition, the computer 1018 can control the gas handling module 1008, which can include gas supply valves connected to various gas sources. Further functions of the processor 1018 can include providing overshoot control, stabilizing the energy, and/or monitoring energy input to the discharge.

The processor 1018 can communicate with the solid-state or thyratron pulser module 1006 and HV power supply 1010, separately or in combination, the gas handling module 1008, the optics modules 1012 and/or 1014, the diagnostic module 1020, and an interface 1026. The processor 1018 also can control an auxiliary volume, which can be connected to a vacuum pump (not shown) for releasing gases from the laser tube 1002 and for reducing a total pressure in the tube. The pressure in the tube can also be controlled by controlling the gas flow through the ports to and from the additional volume.

The laser gas mixture initially can be filled into the laser chamber 1002 in a process referred to herein as a "new fill". In such procedure, the laser tube can be evacuated of laser gases and contaminants, and re-filled with an ideal gas composition of fresh gas. The gas composition for a very stable excimer or molecular fluorine laser can use helium or neon, or a mixture of helium and neon, as buffer gas(es), depending on the laser being used. The concentration of the fluorine in the gas mixture can range from 0.003% to 1.00%, in some embodiments is preferably around 0.1%. An additional gas additive, such as a rare gas or otherwise, can be added for increased energy stability, overshoot control, and/or as an attenuator. Specifically for a $F_2$-laser, an addition of xenon, krypton, and/or argon can be used. The concentration of xenon or argon in the mixture can range from about 0.0001% to about 0.1%. For an ArF-laser, an addition of xenon or krypton can be used, also having a concentration between about 0.0001% to about 0.1%. For the KrF laser, an addition of xenon or argon may be used also over the same concentration.

Halogen and rare gas injections, including micro-halogen injections of about 1–3 milliliters of halogen gas, mixed with about 20–60 milliliters of buffer gas, or a mixture of the halogen gas, the buffer gas, and a active rare gas, per injection for a total gas volume in the laser tube on the order of about 100 liters, for example. Total pressure adjustments and gas replacement procedures can be performed using the gas handling module, which can include a vacuum pump, a valve network, and one or more gas compartments. The gas handling module can receive gas via gas lines connected to gas containers, tanks, canisters, and/or bottles. A xenon gas supply can be included either internal or external to the laser system.

Total pressure adjustments in the form of releases of gases or reduction of the total pressure within the laser tube also can be performed. Total pressure adjustments can be followed by gas composition adjustments if necessary. Total pressure adjustments can also be performed after gas replenishment actions, and can be performed in combination with smaller adjustments of the driving voltage to the discharge than would be made if no pressure adjustments were performed in combination.

Gas replacement procedures can be performed, and can be referred to as partial, mini-, or macro-gas replacement operations, or partial new fill operations, depending on the amount of gas replaced. The amount of gas replaced can be anywhere from a few milliliters up to about 50 liters or more, but can be less than a new fill. As an example, the gas handling unit connected to the laser tube, either directly or through an additional valve assembly, such as may include a small compartment for regulating the amount of gas injected, can include a gas line for injecting a premix A including 1% $F_2$:99% Ne, and another gas line for injecting a premix B including 1% Kr:99% Ne, for a KrF laser. For an ArF laser, premix B can have Ar instead of Kr, and for a $F_2$ laser premix B may not be used. Thus, by injecting premix A and premix B into the tube via the valve assembly, the fluorine and krypton concentrations (for the KrF laser, e.g.) in the laser tube, respectively, can be replenished. A certain amount of gas can be released that corresponds to the amount that was injected. Additional gas lines and/or valves can be used to inject additional gas mixtures. New fills, partial and mini gas replacements, and gas injection procedures, such as enhanced and ordinary micro-halogen injections on the order of between 1 milliliter or less and 3–10 milliliters, and any and all other gas replenishment actions, can be initiated and controlled by the processor, which can control valve assemblies of the gas handling unit and the laser tube based on various input information in a feedback loop.

Exemplary line-narrowing optics contained in the rear optics module can include a beam expander, an optional interferometric device such as an etalon and a diffraction grating, which can produce a relatively high degree of dispersion, for a narrow band laser such as is used with a refractive or catadioptric optical lithography imaging system. As mentioned above, the front optics module can include line-narrowing optics as well.

For a semi-narrow band laser such as is used with an all-reflective imaging system, the grating can be replaced with a highly reflective mirror, and a lower degree of dispersion can be produced by a dispersive prism. A semi-narrow band laser would typically have an output beam linewidth in excess of 1 pm, and can be as high as 100 pm in some laser systems, depending on the characteristic broadband bandwidth of the laser.

The beam expander of the above exemplary line-narrowing optics of the rear optics module can include one or more prisms. The beam expander can include other beam expanding optics, such as a lens assembly or a converging/diverging lens pair. The grating or a highly reflective mirror can be rotatable so that the wavelengths reflected into the acceptance angle of the resonator can be selected or tuned. Alternatively, the grating, or other optic or optics, or the entire line-narrowing module, can be pressure tuned. The grating can be used both for dispersing the beam for achieving narrow bandwidths, as well as for retroreflecting the beam back toward the laser tube. Alternatively, a highly reflective mirror can be positioned after the grating, which can receive a reflection from the grating and reflect the beam back toward the grating in a Littman configuration. The grating can also be a transmission grating. One or more dispersive prisms can also be used, and more than one etalon can be used.

Depending on the type and extent of line-narrowing and/or selection and tuning that is desired, and the particular laser that the line-narrowing optics are to be installed into, there are many alternative optical configurations that can be used.

A front optics module can include an outcoupler for outcoupling the beam, such as a partially reflective resonator reflector. The beam can be otherwise outcoupled by an intra-resonator beam splitter or partially reflecting surface of another optical element, and the optics module could in this case include a highly reflective mirror. The optics control module can control the front and rear optics modules, such as by receiving and interpreting signals from the processor and initiating realignment or reconfiguration procedures.

Various embodiments relate particularly to excimer and molecular fluorine laser systems configured for adjustment of an average pulse energy of an output beam, using gas handling procedures of the gas mixture in the laser tube. The halogen and the rare gas concentrations can be maintained constant during laser operation by gas replenishment actions for replenishing the amount of halogen, rare gas, and buffer gas in the laser tube for KrF and ArF excimer lasers, and halogen and buffer gas for molecular fluorine lasers, such that these gases can be maintained in a same predetermined ratio as are in the laser tube following a new fill procedure. In addition, gas injection actions such as $\mu$HIs can be advantageously modified into micro gas replacement procedures, such that the increase in energy of the output laser beam can be compensated by reducing the total pressure. In contrast, or alternatively, conventional laser systems can reduce the input driving voltage so that the energy of the output beam is at the predetermined desired energy. In this way, the driving voltage is maintained within a small range around $HV_{opt}$, while the gas procedure operates to replenish the gases and maintain the average pulse energy or energy dose, such as by controlling an output rate of change of the gas mixture or a rate of gas flow through the laser tube.

Further stabilization by increasing the average pulse energy during laser operation can be advantageously performed by increasing the total pressure of gas mixture in the laser tube up to $P_{max}$. Advantageously, the gas procedures set forth herein permit the laser system to operate within a very small range around $HV_{opt}$, while still achieving average pulse energy control and gas replenishment, and increasing the gas mixture lifetime or time between new fills.

A laser system having a discharge chamber or laser tube with a same gas mixture, total gas pressure, constant distance between the electrodes and constant rise time of the charge on laser peaking capacitors of the pulser module, can also have a constant breakdown voltage. The operation of the laser can have an optimal driving voltage $HV_{opt}$, at which the generation of a laser beam has a maximum efficiency and discharge stability.

Variations on embodiments described herein can be substantially as effective. For instance, the energy of the laser beam can be continuously maintained within a tolerance range around the desired energy by adjusting the input driving voltage. The input driving voltage can then be monitored. When the input driving voltage is above or below the optimal driving voltage $HV_{opt}$ by a predetermined or calculated amount, a total pressure addition or release, respectively, can be performed to adjust the input driving voltage a desired amount, such as closer to $HV_{opt}$, or otherwise within a tolerance range of the input driving voltage. The total pressure addition or release can be of a predetermined amount of a calculated amount, such as described above. In this case, the desired change in input driving voltage can be determined to correspond to a change in energy, which would then be compensated by the calculated or predetermined amount of gas addition or release, such that similar calculation formulas may be used as described herein.

It should be recognized that a number of variations of the above-identified embodiments will be obvious to one of ordinary skill in the art in view of the foregoing description. Accordingly, the invention is not to be limited by those specific embodiments and methods of the present invention shown and described herein. Rather, the scope of the invention is to be defined by the following claims and their equivalents.

What is claimed is:

1. A method of providing an electrical pulse to drive a discharge chamber of a laser system, the method comprising:
   storing a voltage on a primary storage capacitor;
   applying the voltage from the primary storage capacitor to a step up transformer;
   outputting a stepped up voltage from the step up transformer in response to the applied voltage;
      applying the stepped up voltage to a first capacitor and to a second capacitor,
   wherein the first capacitor and the second capacitor are in parallel to each other relative to the step up transformer, wherein in response to the applied stepped up voltage the first capacitor and the second capacitor store the stepped up voltage;
      reversing a polarity of the stepped up voltage stored in the first capacitor; and
      applying the reversed polarity stepped up voltage on the first capacitor and the stepped up voltage on the second capacitor in series across electrodes of the discharge chamber, whereby a total voltage applied across the electrodes is approximately twice the stepped up voltage.

2. A method according to claim 1, wherein:
   reversing the polarity of the stepped up voltage in the first capacitor includes discharging the stepped up voltage through a winding of the step up transformer.

3. A method according to claim 1, wherein:
   reversing the polarity of the stepped up voltage in the first capacitor includes discharging the stepped up voltage through a magnetic compressor placed across the first capacitor.

4. A method according to claim 1, further comprising:
   cooling said first and second capacitors with at least one fan.

5. A method according to claim 1, further comprising:
   using a solid state switch to trigger the application of the voltage from the primary storage capacitor to the step up transformer.

6. A method according to claim 1, further comprising:
   providing a magnetic compressor across the first capacitor in order to reduce the amount of heat generated by the step up transformer.

7. A method according to claim 1, wherein:
   applying the reversed polarity stepped up voltage on the first capacitor and the stepped up voltage on the second capacitor in series across electrodes of the discharge chamber further includes transmitting the reversed polarity stepped up voltage and stepped up voltage through a compressor inductor to the electrodes.

8. A method according to claim 7, further comprising:
   using a reset control circuit to provide reset current to the compressor inductor.

9. A method according to claim 1, further comprising:
   using at least one compressor stage to reduce the width of a voltage pulse applied to the electrodes.

10. A method according to claim 9, further comprising:
    providing a path for a magnetizing current needed for the at least one compressor stage, the path including at least one inductor and a peaking capacitor.

11. A method according to claim 1, further comprising:
    using a delay element to ensure a properly timed energizing of each of the electrodes.

12. A method of providing an electrical pulse to drive a discharge chamber of a laser system, the method comprising:
    storing a voltage on a primary storage capacitor;
    applying the voltage from the primary storage capacitor to a step up transformer;
    outputting a stepped up voltage from the step up transformer in response to the applied voltage;
    applying the stepped up voltage to a first capacitor and to a second capacitor, wherein the first capacitor and the second capacitor are in parallel to each other relative to the step up transformer, wherein in response to the applied stepped up voltage the first capacitor and the second capacitor store the stepped up voltage;
    discharging the stepped up voltage stored in the first capacitor through an inductor placed across the first capacitor in order to reverse a polarity of the stepped up voltage stored in the first capacitor; and
    applying the reversed polarity stepped up voltage on the first capacitor and the stepped up voltage on the second capacitor across electrodes of the discharge chamber, whereby a total voltage applied across the electrodes is approximately twice the stepped up voltage.

13. A method according to claim 12, further comprising:
    using a solid state switch to trigger the application of the voltage from the primary storage capacitor to the step up transformer.

14. A method according to claim 12, further comprising:
    transmitting the reversed polarity stepped up voltage and stepped up voltage through a compressor inductor to the electrodes.

15. A method according to claim 14, further comprising:
    using a reset control circuit to provide reset current to the compressor inductor.

16. A method according to claim 12, further comprising:
using at least one compressor stage to reduce the width of a voltage pulse applied to the electrodes.

17. A system of providing an electrical pulse to drive a discharge chamber of a laser system, the method comprising:
- a primary storage capacitor capable of storing a voltage;
- a step-up transformer coupled to the primary storage capacitor for receiving the voltage from the primary storage capacitor and outputting a stepped up voltage;
- a first capacitor and a second capacitor each coupled with the step of transformer for receiving and storing the stepped-up voltage output from the step-up transformer, the first capacitor and the second capacitor also coupled to each other in parallel relative to the step up transformer;
- a magnetic compressor coupled across the first capacitor such that the stepped up voltage stored in the first capacitor can be discharged through the magnetic compressor in order to reverse a polarity of the stepped up voltage stored in the first capacitor; and
- discharge electrodes in the discharge chamber capable of receiving the reversed polarity stepped up voltage on the first capacitor and the stepped up voltage on the second capacitor, the first and second capacitors being in series with each other relative to the discharge electrodes, whereby a total voltage applied across the electrodes is approximately twice the stepped up voltage.

* * * * *